United States Patent
Kim et al.

(10) Patent No.: US 9,894,341 B2
(45) Date of Patent: Feb. 13, 2018

(54) APPARATUS AND METHOD FOR PROVIDING IMAGE, AND APPARATUS AND METHOD FOR PLAYING IMAGE

(75) Inventors: Sung Hoon Kim, Daejeon (KR); Joo Young Lee, Daejeon (KR); Hyon Gon Choo, Daejeon (KR); Jin Soo Choi, Daejeon (KR); Jin Woong Kim, Daejeon (KR); Suk Jin Hong, Seoul (KR); Jin Suk Kwak, Daejeon (KR); Min Suk Lee, Daejeon (KR); Dong Wook Kang, Seoul (KR); Kyeong Hoon Jung, Seoul (KR)

(73) Assignees: Electronics and Telecommunications Research Institute, Daejeon (KR); KAI MEDIA CO., Daejeon (KR); Hidea Solutions Co., Ltd., Seoul (KR); Kookmin University Industry Academy Cooperation Foundation, Seoul (KR)

( * ) Notice: Subject to any disclaimer, the term of this patent is extended or adjusted under 35 U.S.C. 154(b) by 780 days.

(21) Appl. No.: 14/238,187

(22) PCT Filed: Aug. 10, 2012

(86) PCT No.: PCT/KR2012/006403
§ 371 (c)(1),
(2), (4) Date: Jul. 7, 2014

(87) PCT Pub. No.: WO2013/022315
PCT Pub. Date: Feb. 14, 2013

(65) Prior Publication Data
US 2014/0307049 A1    Oct. 16, 2014

(30) Foreign Application Priority Data

Aug. 10, 2011  (KR) .................. 10-2011-0079892
Aug. 10, 2012  (KR) .................. 10-2012-0087752

(51) Int. Cl.
*H04N 13/00*    (2006.01)

(52) U.S. Cl.
CPC ..... *H04N 13/0029* (2013.01); *H04N 13/0048* (2013.01); *H04N 13/0055* (2013.01); *H04N 13/0059* (2013.01)

(58) Field of Classification Search
CPC ........... H04N 13/0029; H04N 13/0059; H04N 13/0055; H04N 13/0048
(Continued)

(56) References Cited

U.S. PATENT DOCUMENTS

| 6,078,617 A * | 6/2000 | Nakagawa ........... F16B 31/00 375/240 |
| 2002/0150158 A1* | 10/2002 | Wu ........................ H04N 19/34 375/240.12 |

(Continued)

FOREIGN PATENT DOCUMENTS

| KR | 1020040107844 A | 12/2004 |
| KR | 1020080053175 A | 6/2008 |

(Continued)

*Primary Examiner* — Mohammed Rahaman
*Assistant Examiner* — Richard Carter
(74) *Attorney, Agent, or Firm* — William Park & Associates Ltd.

(57) ABSTRACT

Provided is a video providing method and a video playing method for a three-dimensional (3D) video, and an apparatus for performing the methods. The video providing method may transmit a reconstruction mode for reconstructing a low-resolution additional video having lower resolution than a high-resolution reference video.

8 Claims, 11 Drawing Sheets

(58) Field of Classification Search
USPC ........... 348/43, 51; 375/240, 240.12, 240.16, 375/240.29; 386/209
See application file for complete search history.

(56) References Cited

U.S. PATENT DOCUMENTS

| | | | |
|---|---|---|---|
| 2004/0189796 A1* | 9/2004 | Ho | H04N 13/026 |
| | | | 348/51 |
| 2005/0019000 A1* | 1/2005 | Lim | G06T 3/4084 |
| | | | 386/209 |
| 2008/0008252 A1* | 1/2008 | Xu | H04N 19/61 |
| | | | 375/240.29 |
| 2008/0187045 A1* | 8/2008 | Marquant | H04N 19/63 |
| | | | 375/240.16 |

FOREIGN PATENT DOCUMENTS

| KR | 1020100042771 A | 4/2010 |
|---|---|---|
| KR | 1020100060884 A | 6/2010 |

* cited by examiner

FIG. 6
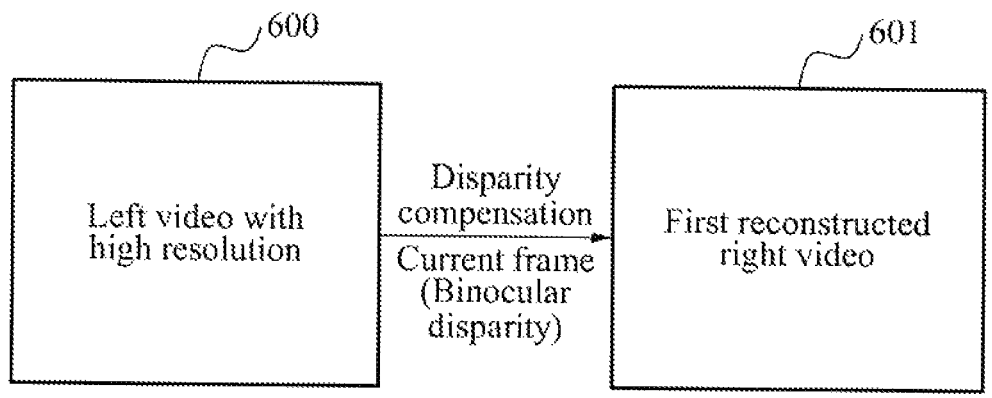
<CASE 1>
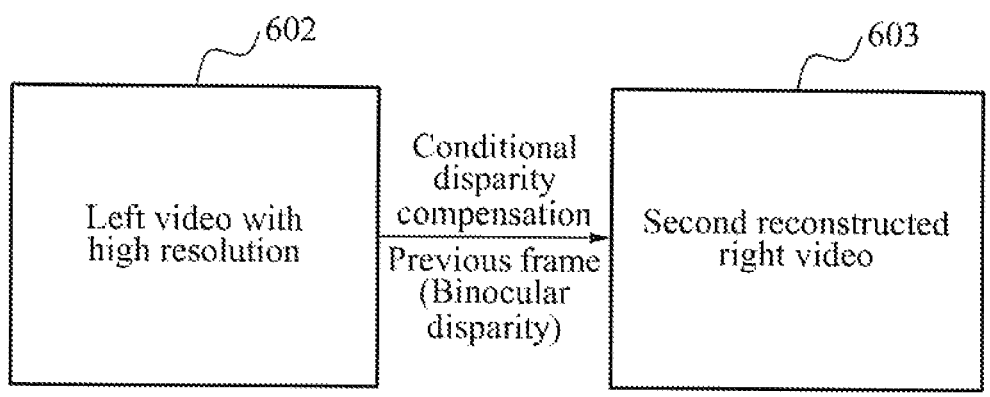
<CASE 2>
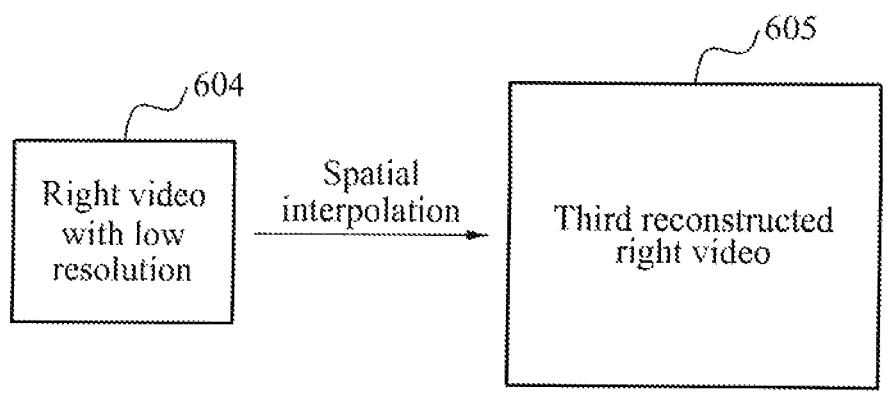
<CASE 3>

US 9,894,341 B2

APPARATUS AND METHOD FOR PROVIDING IMAGE, AND APPARATUS AND METHOD FOR PLAYING IMAGE

TECHNICAL FIELD

The present invention relates to an apparatus and method for reconstructing an additional video having a lower resolution than a reference video for a three-dimensional (3D) video efficiently.

BACKGROUND ART

An advanced television systems committee (ATSC)-mobile/handheld (M/H) broadcast service shares a radio frequency (RF) channel with an ATSC (hereinafter referred to as transport stream main (TS-M)) broadcast service described in ATSC A/53 standard. The M/H broadcast service uses a portion of a bandwidth of about 19.39 megabits per second (Mbps), and is provided to a mobile terminal using a transfer technology over an Internet protocol (IP) transport. An M/H frame having a bandwidth of about 19.39 Mbps is partitioned into TS-M packets and M/H packets using time-division multiplexing that are transmitted to provide different types of broadcast services independently and concurrently.

The TS-M packet is used to provide a TS-M broadcast service via a fixed broadcast network, and the M/H packet is used to provide an audio/video (A/V) service via a mobile broadcast network.

When a left video and a right video of a stereoscopic three-dimensional (3D) video are encoded in accordance with an ATSC fixed broadcast service standard and an M/H broadcast service standard, respectively, and are transmitted through an ATSC-M/H broadcast system, a fixed broadcast service and a mobile broadcast service may be provided. Also, a stereoscopic 3DTV broadcast service may be provided through a terminal that receives a left video and a right video in stereo.

However, since the fixed broadcast service and the mobile broadcast service have different service standards and different channel capacities, a left video and a right video reconstructed in a user terminal have differences in resolution and a level of quantizing noise. Transitively, a 3D video created from a left video and a right video may have quality degradation.

Such an issue stems from a stereoscopic 3DTV broadcast service having an asymmetric video quality between a left video and a right video, for example, a fixed/mobile convergence 3DTV broadcast service through an ATSC-M/H broadcast system, a 3DTV broadcast service through digital video broadcasting-second generation terrestrial (DVB-T2) for high-resolution fixed broadcasting and T-2 mobile/next generation handheld (NGH) for low-resolution mobile broadcasting, a 3DTV broadcast service through integrated services digital broadcasting-terrestrial (ISDB-T) for high-resolution fixed broadcasting and OneSeg for low-resolution mobile broadcasting, a 3DTV broadcast service for a high definition (HD) video, or a reference video, and a standard definition (SD) video, or an additional video, through a simulcast system via a fixed broadcast network, and the like.

DISCLOSURE OF INVENTION

Technical Goals

An aspect of the present invention provides a method and apparatus for reconstructing a right video having relatively low resolution more effectively than a left video having relatively high resolution.

Another aspect of the present invention provides a method and apparatus for reconstructing a right video more effectively using binocular disparity between the right video and a left video.

Still another aspect of the present invention provides a method and apparatus for maintaining a reconstructed right video at a predetermined level of video quality by reconstructing the right video based on conditional disparity replacement.

Yet another aspect of the present invention provides a method and apparatus for encoding binocular disparity for reconstructing a right video efficiently based on a temporal overlap and a spatial overlap.

Technical Solutions

According to an aspect of the present invention, there is provided an apparatus for providing a video, the apparatus including a video identifying unit to identify a high-resolution reference video and a low-resolution additional video, a reconstruction mode determining unit to determine a reconstruction mode for the low-resolution additional video, and a data transmitting unit to transmit the high-resolution reference video, the low-resolution additional video, and additional information including the reconstruction mode.

According to another aspect of the present invention, there is provided an apparatus for providing a video, the apparatus including a binocular disparity generating unit to generate binocular disparity of a current frame using a high-resolution reference video and a high-resolution additional video corresponding to the current frame, a first reconstructed video generating unit to generate a first reconstructed additional video using the high-resolution reference video by compensating for disparity based on the binocular disparity of the current frame, a second reconstructed video generating unit to generate a second reconstructed additional video using the high-resolution reference video by compensating for disparity based on binocular disparity of a previous frame, a third reconstructed video generating unit to generate a third reconstructed additional video by interpolating a low-resolution additional video spatially, and a reconstruction mode determining unit to determine a reconstruction mode for the low-resolution additional video by comparing the first reconstructed additional video, the second reconstructed additional video, and the third reconstructed additional video to the high-resolution additional video.

According to still another aspect of the present invention, there is provided an apparatus for playing a video, the apparatus including a video receiving unit to receive a high-resolution reference video, a low-resolution additional video, and additional information including a reconstruction mode for the low-resolution additional video, and a video reconstructing unit to reconstruct the low-resolution additional video using the additional information.

According to yet another aspect of the present invention, there is provided an apparatus for playing a video, the apparatus including a reconstruction mode identifying unit to identify a reconstruction mode for a block or pixel of a low-resolution additional video, and a video reconstructing unit to reconstruct the low-resolution additional video using the reconstruction mode.

According to another aspect of the present invention, there is provided a method of providing a video, the method including identifying a high-resolution reference video and a low-resolution additional video, determining a reconstruction mode for the low-resolution additional video, and transmitting the high-resolution reference video, the low-resolution additional video, and additional information including the reconstruction mode.

According to still another aspect of the present invention, there is provided a method of providing a video, the method including generating binocular disparity of a current frame using a high-resolution reference video and a high-resolution additional video corresponding to the current frame, generating a first reconstructed additional video using the high-resolution reference video by compensating for disparity based on the binocular disparity of the current frame, generating a second reconstructed additional video using the high-resolution reference video by compensating for disparity based on binocular disparity of a previous frame, generating a third reconstructed additional video by interpolating a low-resolution additional video spatially, and determining a reconstruction mode for the low-resolution additional video by comparing the first reconstructed additional video, the second reconstructed additional video, and the third reconstructed additional video to the high-resolution additional video.

According to yet another aspect of the present invention, there is provided a method of playing a video, the method including receiving a high-resolution reference video, a low-resolution additional video, and additional information including a reconstruction mode for the low-resolution additional video, and reconstructing the low-resolution additional video using the additional information.

According to another aspect of the present invention, there is provided a method of playing a video, the method including identifying a reconstruction mode for a block or pixel of a low-resolution additional video, and reconstructing the low-resolution additional video using the reconstruction mode.

According to still another aspect of the present invention, there is provided a recording medium including a high-resolution reference video, a low-resolution additional video, and a reconstruction mode for reconstructing the low-resolution additional video.

Effects of the Invention

According to an exemplary embodiment, a right video having relatively low resolution may be reconstructed more effectively than a left video having relatively high resolution.

According to another exemplary embodiment, a right video may be reconstructed more effectively using binocular disparity between the right video and a left video.

According to still another exemplary embodiment, a reconstructed right video may be maintained at a predetermined level of video quality by reconstructing the right video based on conditional disparity replacement.

According to further another exemplary embodiment, binocular disparity for reconstructing a right video may be encoded efficiently based on a temporal overlap and a spatial overlap.

BRIEF DESCRIPTION OF DRAWINGS

FIG. 6 is a diagram illustrating a process of reconstructing a right video according to an exemplary embodiment of the present invention.

BEST MODE FOR CARRYING OUT THE INVENTION

Reference will now be made in detail to embodiments of the present invention, examples of which are illustrated in the accompanying drawings.

Figure 1:
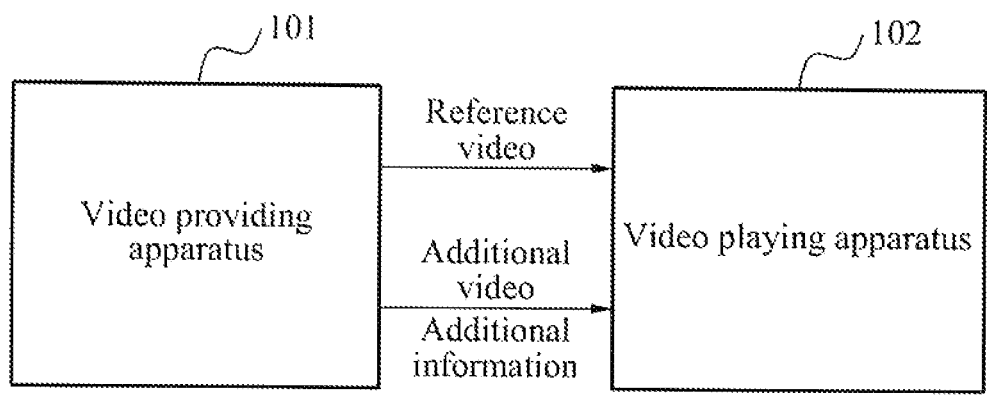
FIG. 1 is a diagram illustrating an entire structure according to an exemplary embodiment of the present invention.

FIG. 1 is a diagram illustrating an entire structure according to an exemplary embodiment of the present invention.

Referring to FIG. 1, a video providing apparatus 101 may transmit a high-resolution reference video, a low-resolution additional video, and additional information to a video playing apparatus 102. The high-resolution reference video and the low-resolution additional video may be used to provide a three-dimensional television (3DTV) service. The high-resolution reference video may correspond to a left video, and the low-resolution additional video may correspond to a right video. The high-resolution reference video and the low-resolution additional video may have different resolutions, and resolution of the reference video may be higher N times than resolution of the additional video, wherein N denotes a real number.

In the description, the high-resolution reference video may be referred to as a left video, and the low-resolution additional video may be referred to as a right video. The present invention may be applied when the left video and the right video used to provide a 3DTV service have an asymmetric resolution. In alternative embodiments, the high-resolution reference video may be referred to as a right video, and the low-resolution additional video may be referred to as a left video. The present invention may be also applied to a plurality of low-resolution videos having different disparities for one high-resolution video.

The present invention may compensate for an objective or subjective quality degradation caused by a video quality difference between a high-resolution left video and a low-resolution right video when transmitting the left video and the right video to provide a 3D video service. The present invention may reconstruct the low-resolution right video efficiently using a high spatial correlation between the left video and the right video and a temporal overlap between a previous frame and a current frame.

In FIG. 1, the video providing apparatus 101 may transmit, to the video playing apparatus 102, additional information about a process of reconstructing the low-resolution right video. The video providing apparatus 101 may transmit the high-resolution left video and the low-resolution right video to the video playing apparatus 102 via different types of broadcast networks. The video playing apparatus 102 may reconstruct the low-resolution right video to match the high-resolution left video based on the transmitted additional information.

For compatibility with an existing broadcast system, the right video needs to be compressed with a higher compression rate than the left video to provide a stereoscopic 3D video. As a result, the right video may have lower video quality than the left video. Here, the video quality may represent a resolution. To produce a stereoscopic 3D video using the left video and the right video having an asymmetric video quality, the right video may be reconstructed to match the left video, however, the reconstructed right video may have a low level of detail, poor edge sharpness of an object, and blocking artifacts.

When a video quality difference between the left video and the right video is insignificant due to a binocular suppression effect, the subjective quality of the 3D video may be determined based on the high-resolution left video. However, when resolution of the right video is much lower than that of the left video, the subjective quality of the 3D video may degrade rapidly. For example, a fixed/mobile convergence 3DTV service system may encode the left video to a high definition (HD) video having 1080 scan lines and the right video to a standard definition (SD) video having 240 scan lines. In this case, a great video quality difference between the left video and the right video may cause rapid degradation of the subjective quality of the 3D video.

In the 3D video produced by synthesizing the left video and the right video transmitted via each independent broadcast network, the present invention may provide a method of reconstructing the right video to match the left video to achieve a predetermined level of subjective quality of the 3D video. In particular, the present invention may use binocular disparity between the left video and the right video to reconstruct the low-resolution right video efficiently. The binocular disparity may be implemented in a form of a vector map. Here, reconstructing the right video may include processing the right video to match the left video in terms of resolution.

The video providing apparatus 101 may transmit, to the video playing apparatus 102, additional information about how to reconstruct the right video for each block or each pixel. The additional information may include a reconstruction mode indicating whether the right video is to be reconstructed using binocular disparity. The reconstruction mode may represent whether the right video is to be reconstructed using binocular disparity or the right video is to be reconstructed by expanding the right video through spatial interpolation.

When a result produced by reconstructing the right video using binocular disparity fails to meet a predetermined standard, the additional information may be determined to be about reconstruction of the right video using spatial interpolation-based expansion. The additional information may be represented by a flag indicating the reconstruction mode. The additional information may be used to reconstruct the right video transmitted from the video providing apparatus 101 so that a video quality of the right video may match a video quality of the left video. The binocular disparity included in the additional information may be determined based on conditional replacement of each block or each pixel of the right video. The binocular disparity may be encoded efficiently based on a temporal overlap and a spatial overlap.

Figure 2:
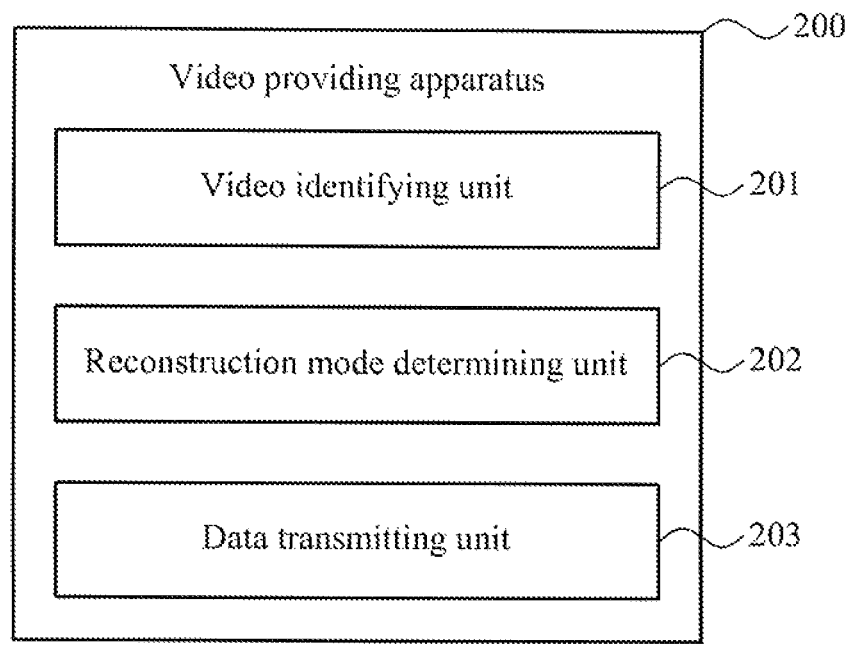
FIG. 2 is a block diagram illustrating a video providing apparatus according to an exemplary embodiment of the present invention.

FIG. 2 is a block diagram illustrating a video providing apparatus 200 according to an exemplary embodiment of the present invention.

Referring to FIG. 2, the video providing apparatus 200 may include a video identifying unit 201, a reconstruction mode determining unit 202, and a data transmitting unit 203.

The video identifying unit 201 may identify a high-resolution left video and a low-resolution right video. The low-resolution right video may correspond to a result produced by down-sampling or compressing an original right video having high resolution.

The reconstruction mode determining unit 202 may determine a reconstruction mode for the low-resolution right video.

As an example, the reconstruction mode determining unit 202 may generate a first reconstructed right video using the high-resolution left video by compensating for disparity based on binocular disparity. Also, the reconstruction mode determining unit 202 may generate a second reconstructed right video by interpolating the low-resolution right video spatially. The reconstruction mode determining unit 202 may determine a reconstruction mode to have a pixel value difference less than or equal to a reference value by comparing the first reconstructed right video and the second reconstructed right video to a high-resolution right video. The reconstruction mode may be determined for each pixel or each block of the high-resolution left video.

As another example, the reconstruction mode determining unit 202 may generate a first reconstructed right video using the high-resolution left video by compensating for disparity based on binocular disparity of a current frame, and may generate a second reconstructed right video using the high-resolution left video by compensating for disparity based on binocular disparity of a previous frame. For example, the second reconstructed right video may be generated by replacing a portion of an additional video with a disparity-compensated reference video having high resolution based on the binocular disparity of the previous frame. The second reconstructed right video may be generated by conditional disparity compensation. The second reconstructed right video may be generated by applying disparity compensation to only a pixel to which a binocular disparity vector is assigned normally in the previous frame. A non-compensated pixel in the second reconstructed right video may fail to have a meaningful pixel value. The reconstruction mode determining unit 202 may generate a third reconstructed right video by interpolating the low-resolution right video spatially. Here, the spatial interpolation may include expanding resolution of the low-resolution right video and filling in a missing pixel, through linear interpolation, in the expanded result.

The reconstruction mode determining unit 202 may determine a reconstruction mode to have a pixel value difference less than or equal to the reference value, by comparing the first reconstructed right video, the second reconstructed right video, and the third reconstructed right video to the original right video having high resolution. The reconstruction mode may be determined for each pixel or each block in the high-resolution left video.

The binocular disparity may be determined by estimating disparity between the high-resolution left video and the high-resolution additional video. A further detailed description of the binocular disparity is provided with reference to FIG. 7.

The data transmitting unit 203 may transmit the high-resolution left video, the low-resolution right video, and additional information including the reconstruction mode. Here, the high-resolution left video and the low-resolution right video may be encoded using various video encoding techniques, and transmitted. The high-resolution left video may be transmitted via a fixed broadcast network, and the low-resolution right video may be transmitted via a mobile broadcast network.

Figure 3:
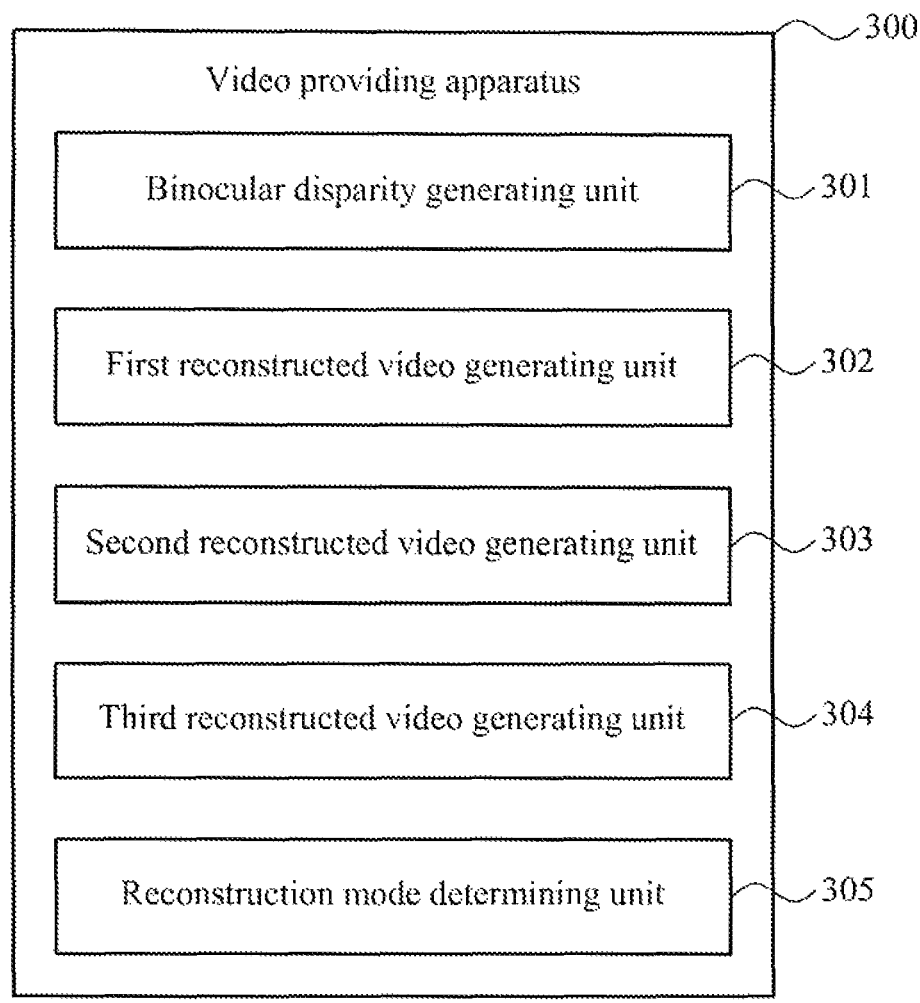
FIG. 3 is a block diagram illustrating a video providing apparatus according to another exemplary embodiment of the present invention.

FIG. 3 is a block diagram illustrating a video providing apparatus 300 according to another exemplary embodiment of the present invention.

Referring to FIG. 3, the video providing apparatus 300 may include a binocular disparity generating unit 301, a first reconstructed video generating unit 302, a second reconstructed video generating unit 303, a third reconstructed video generating unit 304, and a reconstruction mode determining unit 305.

The binocular disparity generating unit 301 may generate binocular disparity of a current frame using a high-resolution left video and a high-resolution right video corresponding to the current frame. A process of generating the binocular disparity may be performed with regard to the current frame.

The first reconstructed video generating unit 302 may generate a first reconstructed right video using the high-resolution left video by compensating for disparity based on the binocular disparity of the current frame.

The second reconstructed video generating unit 303 may generate a second reconstructed right video using the high-resolution left video by compensating for disparity based on binocular disparity of a previous frame. For example, the second reconstructed right video may be generated by replacing a portion of an additional video with a disparity-compensated reference video having high resolution based on the binocular disparity of the previous frame. The second reconstructed right video may be generated by conditional disparity compensation. The second reconstructed right video may be generated by applying disparity compensation to only a pixel to which a binocular disparity vector is assigned normally in the previous frame.

A non-compensated pixel in the second reconstructed right video may fail to have a meaningful pixel value. The binocular disparity of the previous frame may be derived from the previous frame temporally preceding the current frame in which a block or pixel used to determine a reconstruction mode is included. In a case of N frames, generation of the second reconstructed right video may fail in an initial frame.

The third reconstructed video generating unit 304 may generate a third reconstructed right video by interpolating a low-resolution right video spatially.

The reconstruction mode determining unit 305 may determine a reconstruction mode for the low-resolution right video by comparing the first reconstructed right video, the second reconstructed right video, and the third reconstructed right video to the high-resolution right video.

Figure 4:
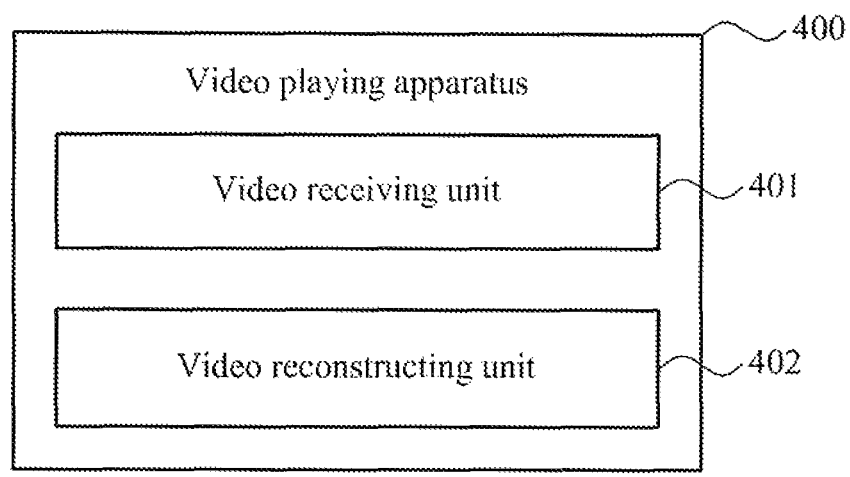
FIG. 4 is a block diagram illustrating a video playing apparatus according to an exemplary embodiment of the present invention.

FIG. 4 is a block diagram illustrating a video playing apparatus 400 according to an exemplary embodiment of the present invention.

Referring to FIG. 4, the video playing apparatus 400 may include a video receiving unit 401 and a video reconstructing unit 402.

The video receiving unit 401 may receive, from a video providing apparatus, a high-resolution left video, a low-resolution right video, and additional information including a reconstruction mode for the low-resolution right video.

The video reconstructing unit 402 may reconstruct the low-resolution right video using the additional information. The additional information may include a first reconstruction mode for reconstructing the low-resolution right video into a first reconstructed right video generated using the high-resolution left video by compensating for disparity based on binocular disparity of a current frame. The additional information may include a second reconstruction mode for reconstructing the low-resolution right video into a second reconstructed right video generated using the high-resolution left video by compensating for disparity based on binocular disparity of a previous frame. The second reconstructed right video may be generated by replacing a portion of an additional video with a disparity-compensated reference video having high resolution based on the binocular disparity of the previous frame. Also, the additional information may include a third reconstruction mode for reconstructing the low-resolution right video into a third reconstructed right video by interpolating the low-resolution right video spatially.

When the reconstruction mode for the low-resolution right video is determined to be the first reconstruction mode, the additional information may include a binocular disparity vector map of the current frame used to reconstruct the low-resolution right video in the first reconstruction mode. The binocular disparity vector map of the current frame may be encoded separately. When the reconstruction mode for the low-resolution right video is determined to be the second reconstruction mode, the additional information may include a binocular disparity vector map of the previous frame used to reconstruct the low-resolution right video in the second reconstruction mode.

Here, the additional information may include a reconstruction mode for each low-resolution right video determined by the video providing apparatus. The video playing apparatus may extract a reconstruction mode for a low-resolution right video to be reconstructed, from the additional information provided by the video providing apparatus. In alternative embodiments, the video playing apparatus may determine the reconstruction mode for the low-resolution right video separately.

In this instance, for the left video being shifted within a search range with regard to a location of each pixel or each block of the right video, the binocular disparity may correspond to a shift value when differences in pixel value and horizontal gradient between the left video and the right video are at a minimum. The left video may be transmitted via a fixed network, and the right video may be transmitted via a mobile network.

Figure 5:
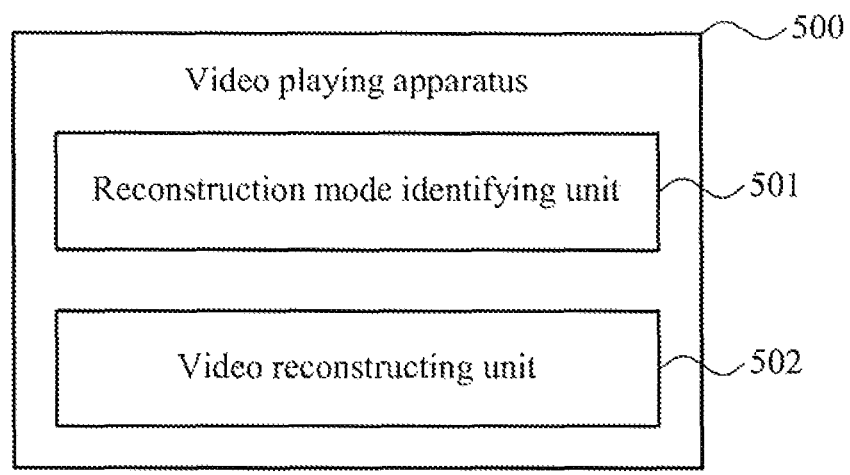
FIG. 5 is a block diagram illustrating a video playing apparatus according to another exemplary embodiment of the present invention.

FIG. 5 is a block diagram illustrating a video playing apparatus 500 according to another exemplary embodiment of the present invention.

Referring to FIG. 5, the video playing apparatus 500 may include a reconstruction mode identifying unit 501 and a video reconstructing unit 502.

The reconstruction mode identifying unit 501 may identify a reconstruction mode for a block or pixel of a low-resolution additional video. The reconstruction mode may include a first reconstruction mode for reconstructing the low-resolution right video into a first reconstructed right video generated using the high-resolution left video by compensating for disparity based on binocular disparity of a current frame. The reconstruction mode may include a second reconstruction mode for reconstructing the low-resolution right video into a second reconstructed right video generated using the high-resolution left video by compensating for disparity based on binocular disparity of a previous frame. The second reconstructed right video may be generated by replacing a portion of an additional video with a disparity-compensated reference video having high resolution, based on the binocular disparity of the previous frame. Also, the reconstruction mode may include a third reconstruction mode for reconstructing the low-resolution right video into a third reconstructed right video by interpolating the low-resolution right video spatially.

Here, the reconstruction mode may include a reconstruction mode for each low-resolution right video determined by the video providing apparatus. The video playing apparatus may extract a reconstruction mode for a low-resolution right video to be reconstructed, from additional information provided by the video providing apparatus. In alternative embodiments, the video playing apparatus may determine the reconstruction mode for the low-resolution right video separately.

In this instance, for the left video being shifted within a search range with regard to a location of each pixel or each block of the right video, the binocular disparity may correspond to a shift value when differences in a pixel value and a horizontal gradient between the left video and the right video are at a minimum. The left video may be transmitted via a fixed network, and the right video may be transmitted via a mobile network.

The video reconstructing unit 502 may reconstruct the low-resolution right video based on the reconstruction mode. When the reconstruction mode is determined to be the first reconstruction mode, the low-resolution right video may be reconstructed using the high-resolution left video by compensating for disparity based on binocular disparity of a current frame. When the reconstruction mode is determined to be the second reconstruction mode, the low-resolution right video may be reconstructed using the high-resolution left video by compensating for disparity based on binocular disparity of a previous frame. In the second reconstruction mode, the low-resolution right video may be reconstructed by replacing a portion of an additional video with a disparity-compensated reference video having high resolution based on the binocular disparity of the previous frame. When the reconstruction mode is determined to be the third reconstruction mode, the low-resolution right video may be reconstructed by interpolating the low-resolution right video spatially. Here, reconstruction may refer to processing the low-resolution right video into an original right video having high resolution.

FIG. 6 is a diagram illustrating a process of reconstructing a right video according to an exemplary embodiment of the present invention.

Referring to FIG. 6, CASE 1 illustrates an example of a first reconstructed right video 601 generated using a high-resolution left video 600 by compensating for disparity based on binocular disparity of a current frame. CASE 2 illustrates an example of a second reconstructed right video 602 generated using a high-resolution left video 602 by compensating for disparity conditionally based on binocular disparity of a previous frame. Here, the conditional disparity compensation may refer to applying disparity compensation to only a pixel to which a binocular disparity vector is assigned normally whereby a non-compensated pixel may fail to have a meaningful pixel value. CASE 3 illustrates an example of a second reconstructed right video 605 generated by interpolating a low-resolution right video 604 spatially. The spatial interpolation may correspond to increasing resolution of the low-resolution right video 602 through linear interpolation and the like.

According to an exemplary embodiment of the present invention, the video providing apparatus may use a reconstructed right image most similar to an original right video having high resolution among the first reconstructed right image 601 of CASE 1, the second reconstructed right image 602 of CASE 2, and the third reconstructed right image 603 of CASE 3. The video providing apparatus may compare the first reconstructed right image 601 of CASE 1, the second reconstructed right image 602 of CASE 2, and the third reconstructed right image 603 of CASE 3 to the original right video having high resolution, and may use a reconstructed result having a pixel value difference less than or equal to a reference value.

Figure 7:
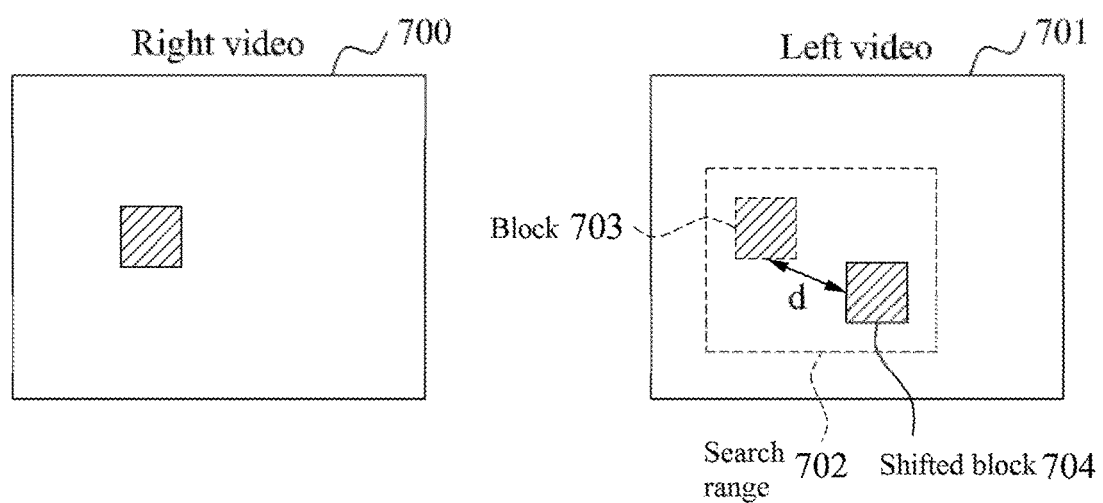
FIG. 7 is a diagram illustrating binocular disparity according to an exemplary embodiment of the present invention.

FIG. 7 is a diagram illustrating binocular disparity according to an exemplary embodiment of the present invention.

The binocular disparity according to the present invention is described with reference to FIG. 7. When a left video 701 is shifted by one pixel within a search range 702 with regard to a current location of a block 703 of a right video 700, the binocular disparity corresponds to a distance between a shifted block 704 and the block 703 when an overall difference in pixel value and horizontal gradient is at a minimum. Here, 'd' denotes the binocular disparity. The binocular disparity corresponds to a distance between most similar blocks using a block of the right video 700 and a block of the left video 701. The binocular disparity occurs due to a difference in vision for the same object seen with left and right eyes of a human.

Although FIG. 7 shows binocular disparity using a block, the binocular disparity may be derived using a pixel of the left video 701.

Figure 8:
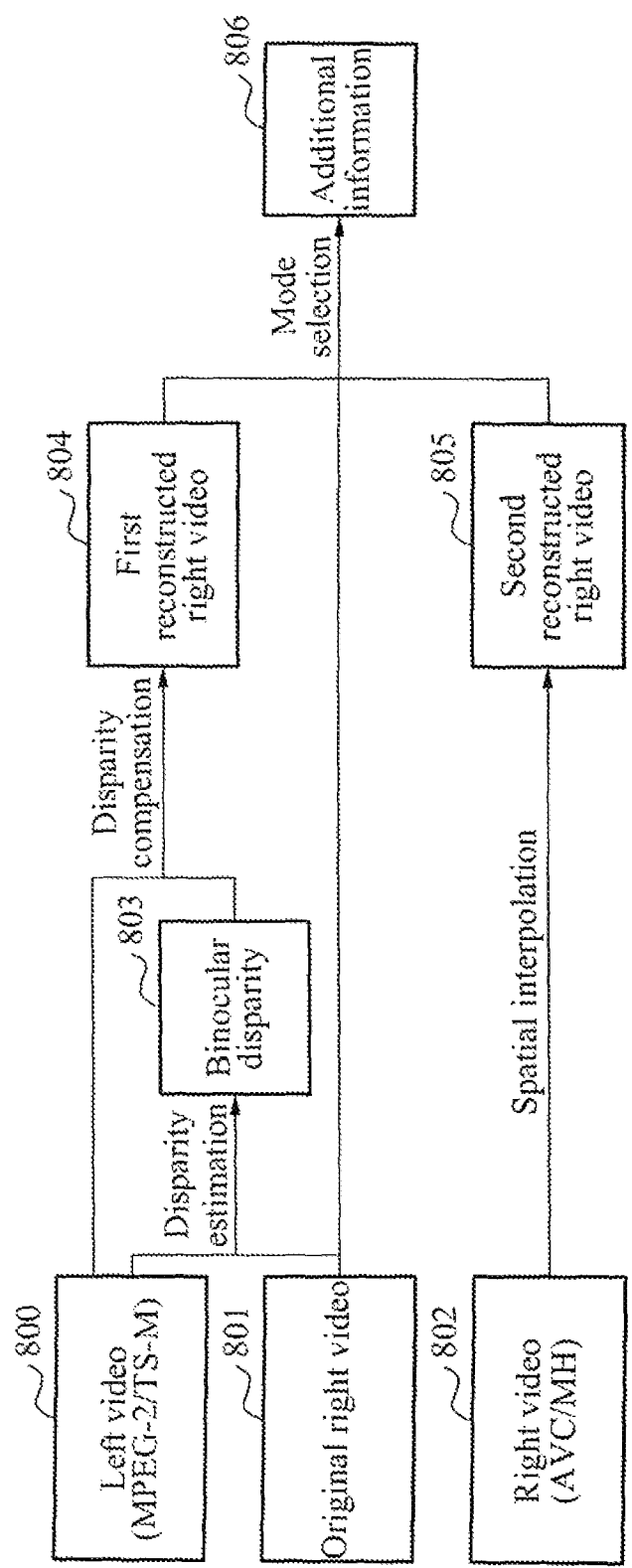
FIG. 8 is a diagram illustrating a process of generating additional information according to an exemplary embodiment of the present invention.

FIG. 8 is a diagram illustrating a process of generating additional information according to an exemplary embodiment of the present invention.

Referring to FIG. 8, a left video 800 and a right video 801 may be provided. In this instance, the left video 800 and the original right video 801 may have the same resolution. However, a right video 802 may have lower resolution than those of the left video 800 and the original right video 801.

The left video 800 may be transmitted in a form of TS-M packets via a fixed broadcast network, and the right video 801 may be transmitted in a form of M/H packets via a mobile broadcast network. Since the mobile broadcast network has a lower channel capacity than the fixed broadcast network, the right video 801 may be encoded at a higher compression rate than the left video 800 or may be processed at a lower resolution than the left video 800. When the left video 800 is transmitted in full HD, the right video 802 may be compressed from the original right video 801 and may be transmitted in SD or HD.

The video providing apparatus 101 may derive binocular disparity 803 by estimating disparity between the left video 800 and the original right video 801. The binocular disparity

803 may be represented in a form of a vector. The video providing apparatus 101 may generate a first reconstructed right video 804 using the left video 800 by compensating for disparity based on the binocular disparity 803. The video providing apparatus 101 may generate a second reconstructed right video 805 by increasing resolution of the right video 802 through spatial interpolation. The first reconstructed right video 804 and the second reconstructed right video 805 may have the same resolution as the left video 800.

The video providing apparatus 101 may determine whether a pixel value difference is less than or equal to a reference value, by comparing the first reconstructed right video 804 and the second reconstructed right video 805 to the original right video 801. When the right video 802 is reconstructed using the first reconstructed right video 804, a first reconstruction mode may be selected, and when the right video 802 is reconstructed using the second reconstructed right video 805, a second reconstruction mode may be selected. The reconstruction mode may be determined for each pixel or each block of the left video 800, and may be included in additional information 806 and transmitted to the video playing apparatus 102. When the reconstruction mode is determined to be the first reconstruction mode, the additional information 806 may include the binocular disparity 803 used to generate the first reconstructed right video 804.

As a result, in most instances, the second reconstruction mode may be selected since the first reconstruction mode has a great burden of transmitting the binocular disparity 803 as additional information. However, when a reconstructed result in the first reconstruction mode is better than a reconstructed result in the second reconstruction mode, the first reconstruction mode may be selected despite the data transmission burden.

Alternatively, the video providing apparatus 101 may generate the additional information 806 indicating conditional disparity replacement. The video providing apparatus 101 may compare a pixel value difference between the first reconstructed right video 804 and the original right video 801 to a reference value. When the pixel value difference between the first reconstructed right video 804 and the original right video 801 is less than or equal to the reference value, the video providing apparatus 101 may select the first reconstruction mode using binocular disparity to be a reconstruction mode for the right video 802. In the first reconstruction mode, the first reconstructed right video 804 may be used.

When the pixel value difference between the first reconstructed right video 804 and the original right video 801 is less than the reference value, the video providing apparatus 101 may select the second reconstruction mode using the second reconstructed right video 805 to be a reconstruction mode for the right video 802. In the second reconstruction mode, the second reconstructed right video 805 may be used.

The additional information 806 may be used to increase resolution of the right video 802 to match resolution of the left video 800. Increasing the resolution of the right video 802 may be defined as reconstructing the right video 802. The additional information 806 may be generated for each block or each pixel of the right video 802. The additional information 806 may be represented in a form of a flag indicating whether to reconstruct the right video 802 in the first reconstruction mode or the second reconstruction mode for each block or each pixel of the right video 802. The left video 800, the right video 802, and the additional information 806 may be transmitted from the video providing apparatus 101 to the video playing apparatus 102. When the right video 802 is reconstructed in the first reconstruction mode is used, binocular disparity used to reconstruct the right video 802 may be included in the additional information 806 and transmitted to the video playing apparatus 102.

Figure 9:
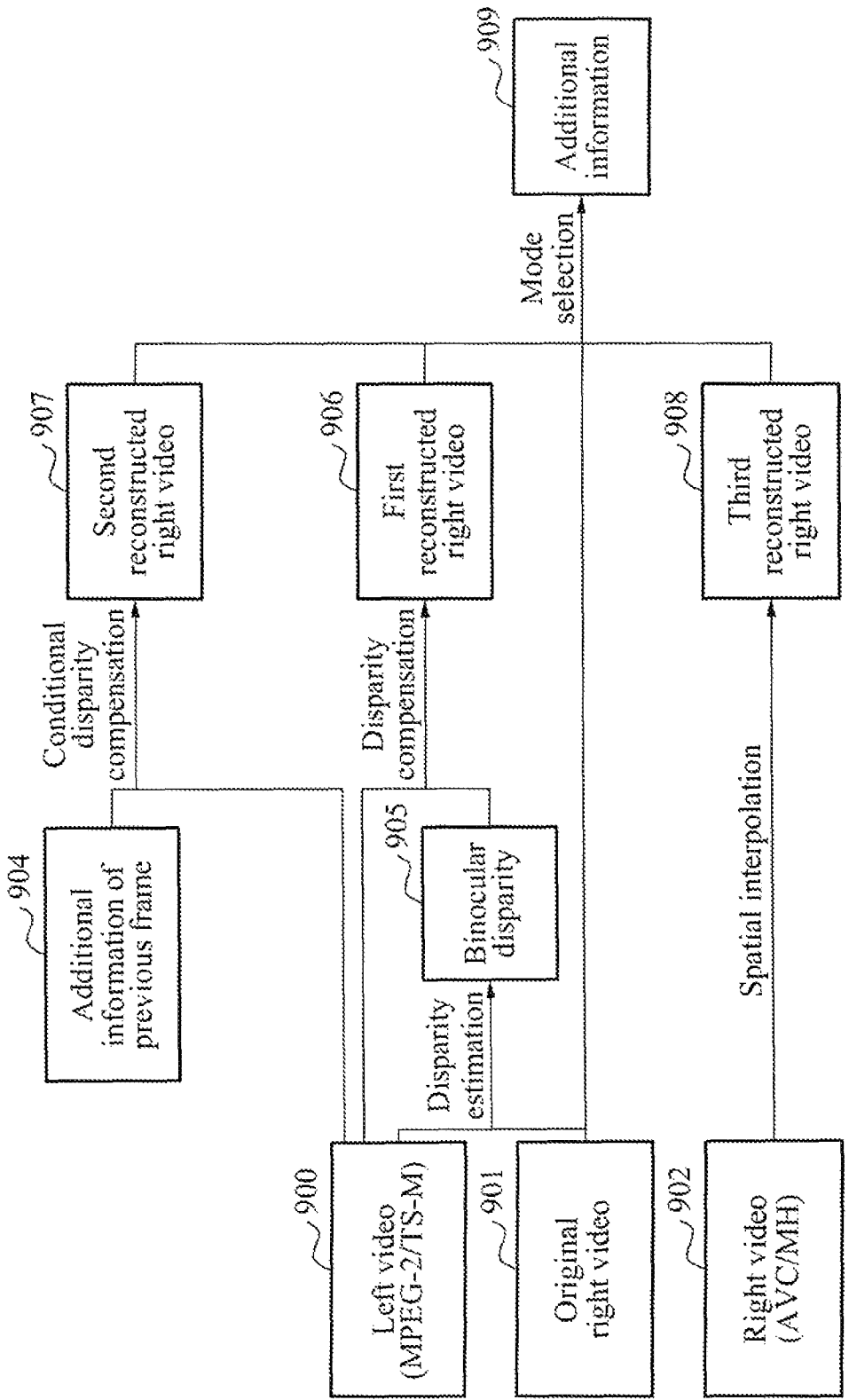
FIG. 9 is a diagram illustrating a process of generating additional information according to another exemplary embodiment of the present invention.

FIG. 9 is a diagram illustrating a process of generating additional information according to another exemplary embodiment of the present invention.

Referring to FIG. 9, a left video 900 and a right video 901 may be provided. In this instance, the left video 900 and the original right video 901 may have the same resolution. However, a right video 902 may have lower resolution than those of the left video 900 and the original right video 901.

In a stereoscopic 3D video, binocular disparity between a left video and a right video has a high spatial correlation. When a subject is photographed to produce a left video and a right video corresponding to left and right eyes of a human respectively, the subject is depicted as one object in a majority of areas of the left and right videos. Since the area represents identical or similar binocular disparity, the binocular disparity between the left video and the right video has a high spatial correlation.

Also, when a transition is absent between a previous frame and a current frame, a temporal correlation between the previous frame and the current frame is high. When a transition is absent, binocular disparity of the previous frame and binocular disparity of the current frame have a high temporal correlation.

According to the present invention, the additional information may be encoded efficiently using a temporal overlap and a spatial overlap. Here, the additional information may include a reconstruction mode for a right video and binocular disparity corresponding to the reconstruction mode. In this instance, encoding using the spatial overlap may include, for example, variable block encoding using a quadtree. Also, encoding using the temporal overlap may include, for example, temporal estimation encoding. In FIG. 9, the temporal estimation encoding for the additional information is illustrated.

The video providing apparatus 101 may extract binocular disparity 905 of a current frame by estimating disparity between the left video 900 and the original right video 901. The video providing apparatus 101 may generate a first reconstructed right video 906 using the left video 900 by compensating for disparity based on the binocular disparity 905.

The video providing apparatus 101 may generate a second reconstructed right video 907 using the left video 900 by compensating for disparity based on binocular disparity included in additional information 904 of a previous frame. For example, the second reconstructed right video 907 may be generated by replacing a portion of an additional video with a disparity-compensated reference video having high resolution based on the binocular disparity of the previous frame. The second reconstructed right video may be generated by conditional disparity compensation. The second reconstructed right video may be generated by applying disparity compensation to only a pixel to which a binocular disparity vector is assigned normally in the previous frame.

A non-compensated pixel in the second reconstructed right video may fail to have a meaningful pixel value. Since the reconstruction mode is determined for each pixel, a predetermined pixel in the previous frame may be reconstructed through spatial interpolation rather than binocular disparity. Since the binocular disparity included in the additional information 904 of the previous frame is derived from the previous frame, a need to extract binocular disparity of a current frame separately is absent.

Also, the video providing apparatus 101 may generate a third reconstructed right video 908 by increasing resolution of the right video 902 through spatial interpolation.

The video providing apparatus 101 may compare the first reconstructed right video 906, the second reconstructed right video 907, and the third reconstructed right video 908 to the original right video 901, and may select a reconstructed result having a pixel value difference less than or equal to the reference value to be a reconstruction mode for the right video 902. A first reconstruction mode may refer to reconstructing the right video 902 to the first reconstructed right video 906. A second reconstruction mode may refer to reconstructing the right video 902 to the second reconstructed right video 907. A third reconstruction mode may refer to reconstructing the right video 902 to the third reconstructed right video 908. The video providing apparatus 101 may transmit the selected reconstruction mode as additional information 909.

When the additional information 909 includes the first reconstruction mode, the additional information 909 may include binocular disparity 905 extracted separately from the current frame as well as the additional information 909. When the additional information 909 includes the second reconstruction mode or the third reconstruction mode, a need to include the binocular disparity 905 in the additional information 909 separately may be unnecessary.

As described in the foregoing, the additional information 909 may be determined for each block or each pixel of the right video 901. As the use of the binocular disparity of the previous frame increases, the binocular disparity to be transmitted in actuality as additional information may be reduced.

Figure 10:
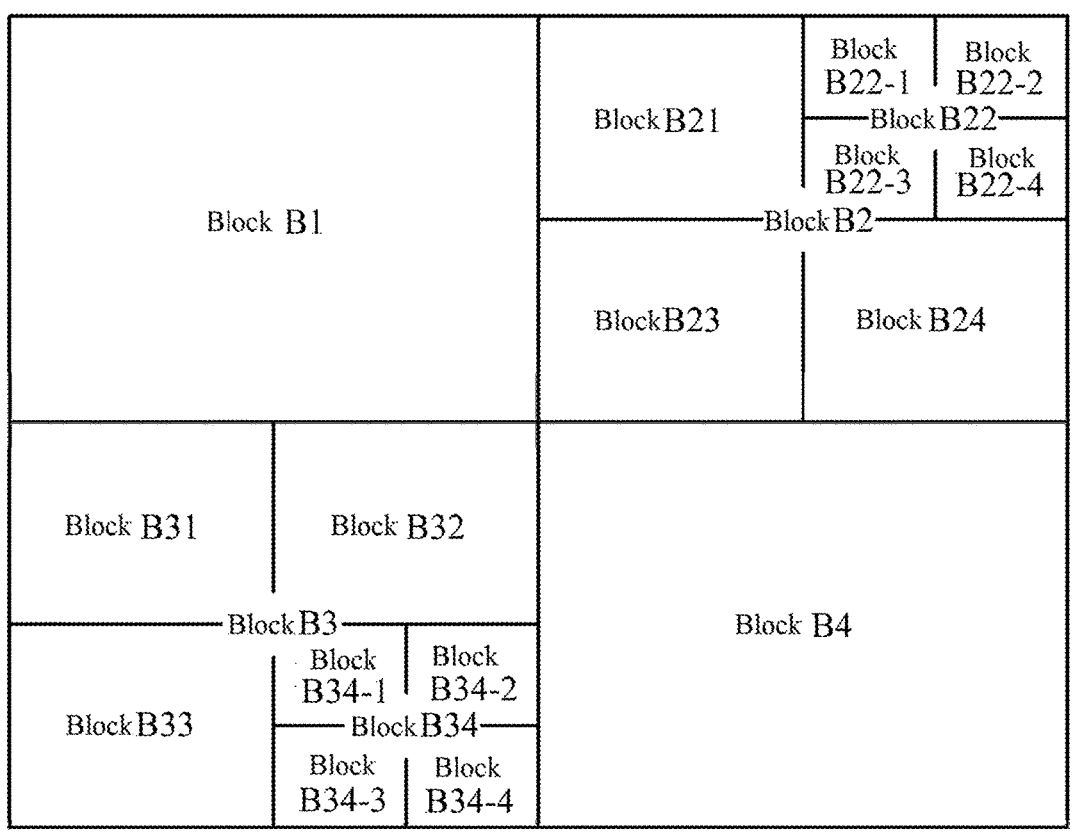
FIG. 10 is a diagram illustrating an application example of a quadtree according to an exemplary embodiment of the present invention.

FIG. 10 is a diagram illustrating an application example of a quadtree according to an exemplary embodiment of the present invention.

The quadtree may be used to encode or decode a right video based on a spatial overlap between the right video and a left video. Hereinafter, a description of the video playing apparatus 102 executing a decoding operation is provided.

In Step 1, the video playing apparatus 102 may generate a right video that is intermediate in size between a left video and a right video used for a 3D video. The right video may have a resolution lower than that of the left video.

In Step 2, the video playing apparatus 102 may divide the right video of intermediate resolution into non-overlapping blocks. In this instance, the video playing apparatus 102 may divide the right video into four blocks using the quadtree.

In Step 3, the video playing apparatus 102 may reconstruct the block of the right video using the block of the left video by compensating for disparity based on binocular disparity. When a difference between the reconstructed block and the original block is less than or equal to a reference value, the video playing apparatus 102 may stop further quadtree-based division, and may reconstruct the corresponding block using the binocular disparity.

In step 4, when the difference between the reconstructed block and the original block is greater than the reference value, the video playing apparatus 102 may subdivide the corresponding block into four blocks using a quadtree. The video playing apparatus 102 may perform step 3 on the four sub-blocks.

Steps 1 through 4 may be performed iteratively. When a sub-block generated by dividing a block using a quadtree has a predetermined minimum size, the video playing apparatus 102 may transmit the sub-block through an M/H channel. In step 5, the video playing apparatus 102 may reconstruct the sub-block by expanding the right video through interpolation.

When all the four blocks are determined to be reconstructed through interpolation of the right video, the video playing apparatus 102 may combine the four blocks to generate one block and may reconstruct the generated block by expanding the right video through interpolation. This combination and reconstruction may be performed iteratively until a size of the corresponding block equals a size of a block generated by initial division. Subsequently, the finally reconstructed right video of intermediate size may be expanded through linear interpolation to match the size of the left video.

In FIG. 10, blocks B1 and B4 may be generated using the left video by compensating for disparity based on binocular disparity. Also, blocks B21, B23, and B24 and blocks B31, B32, and B33 may be generated using the left video by compensating for disparity based on binocular disparity. When blocks B22-1 through B22-4 have a predetermined minimum size, the blocks B22-1 through B22-4 may be generated by expanding the right video through interpolation. Similarly, blocks B34-1 through B34-4 may be generated by expanding the right video through interpolation.

When the binocular disparity is encoded using a quadtree described in the foregoing, a flag indicating whether reconstruction using binocular disparity is to be performed may be assigned to each block. Here, the flag may denote additional information for reconstructing a corresponding block, and the additional information may be encoded hierarchically for each block. To encode the additional information, various entropy encoding may be used in addition to fixed length encoding.

Hereinafter, additional information for reconstructing a block of a right video is described.

TABLE 1

| Reconstruction scheme | Additional information to be encoded or transmitted |
| --- | --- |
| Reconstruction by expansion through interpolation | None |
| Reconstruction using a left video by compensating for disparity based on binocular disparity of a previous frame | None |
| Reconstruction using a left video by compensating for disparity based on binocular disparity of a current frame | Binocular disparity for each block |
| Using sub-block | None |

When a left video and a right video having different video qualities are transmitted via different broadcast networks, the video providing apparatus 101 may transmit additional information through a separate independent signaling channel to ensure backward compatibility with a conventional broadcast network. As an example, when the left video is transmitted in an ATSC 8-VSB TS-M stream and the right video is transmitted in an ATSC M/H stream, the video providing apparatus 101 may transmit additional information through a signaling channel, for example, program-specific information (PSI)/program and system information protocol (PSIP) in TS-M stream.

As another example, the video providing apparatus 101 may transmit the additional information in a form of packets using an independent packet identification (PID), and may include the PID and an interpretation of the PID in a signaling channel for a 3DTV service, for example, PSI/PSIP. As still another example, the video providing apparatus 101 may transmit the additional information through a signaling channel, for example, fast information channel (FIC)/simultaneous multithreading (SMT) in M/H stream. The video providing apparatus 101 may transmit the additional information in a predetermined IP stream in M/H stream, and may include a PID associated with the additional information and an interpretation of the PID through a signaling channel for a 3DTV service, for example, FIC/SMT.

Figure 11:
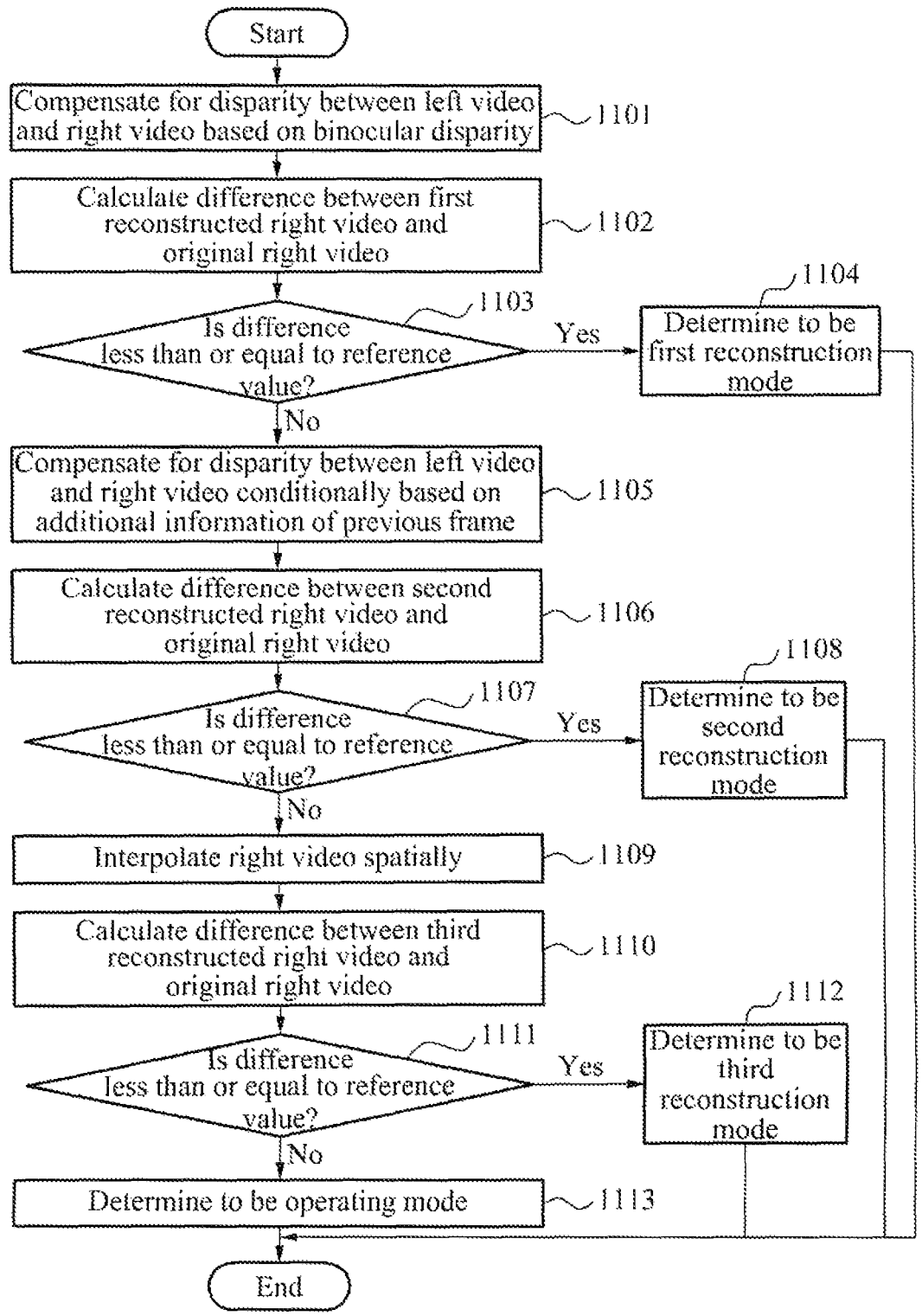
FIG. 11 is a flowchart illustrating a method of generating additional information in a video providing apparatus according to an exemplary embodiment of the present invention.

FIG. 11 is a flowchart illustrating a method of generating additional information in a video providing apparatus according to an exemplary embodiment of the present invention.

In operation 1101, the video providing apparatus 101 may generate a first reconstructed right video using a left video by compensating for disparity based on binocular disparity between the left video and a right video. Here, disparity compensation may refer to processing the left video to match the right video using binocular disparity. The left video may have higher resolution than the right video.

In operation 1102, the video providing apparatus 101 may calculate a pixel value difference between the first reconstructed right video and the original right video.

In operation 1103, the video providing apparatus 101 may determine whether the pixel value difference is less than or equal to a predetermined reference value.

In operation 1104, when the pixel value difference is less than or equal to the reference value, the video providing apparatus 101 may determine a reconstruction mode for the right video to be a first reconstruction mode. When the reconstruction mode for the right video is determined to be the first reconstruction mode, the binocular disparity may be included in additional information. The additional information may be determined for each block or each pixel of the right video.

In operation 1105, when the pixel value difference is greater than the reference value, the video providing apparatus 101 may generate a second reconstructed right video using the left video by compensating for disparity using additional information of a previous frame. Here, the additional information of the previous frame may include binocular disparity derived from the previous frame. The binocular disparity in operation 1101 may correspond to a derived result by estimating binocular disparity of a current frame. For example, the second reconstructed right video may be generated by replacing a portion of an additional video with a disparity-compensated reference video having high resolution based on the binocular disparity of the previous frame. The second reconstructed right video may be generated by conditional disparity compensation. The second reconstructed right video may be generated by applying disparity compensation to only a pixel to which a binocular disparity vector is assigned normally among the previous frame. A non-compensated pixel in the second reconstructed right video may fail to have a meaningful pixel value.

In operation 1106, the video providing apparatus 101 may calculate a pixel value difference between the second reconstructed right video and the original right video. Also, the video providing apparatus 101 may determine whether the pixel value difference is less than or equal to the reference value. In operation 1108, when the pixel value difference is less than or equal to the reference value, the video providing apparatus 101 may determine the reconstruction mode for the right video to be a second reconstruction mode.

In operation 1109, when the pixel value difference is greater than the reference value, the video providing apparatus 101 may generate a third reconstructed right video by interpolating the right video spatially. Here, the spatial interpolation may correspond to increasing resolution of the right video through linear interpolation and the like. In operation 1110, the video providing apparatus 101 may calculate a pixel value difference between the third reconstructed right video and the original right video.

In operation 1112, when the pixel value difference is less than or equal to the reference value, the video providing apparatus 101 may determine the reconstruction mode for the right video to be a third reconstruction mode. In operation 1113, when the pixel value difference is greater than the reference value, the video providing apparatus 101 may determine a reconstruction mode for the corresponding block to be an operating mode. Here, the operating mode may refer to non-selection of the reconstruction mode for the corresponding block among the first reconstruction mode, the second reconstruction mode, and the third reconstruction mode.

Figure 12:
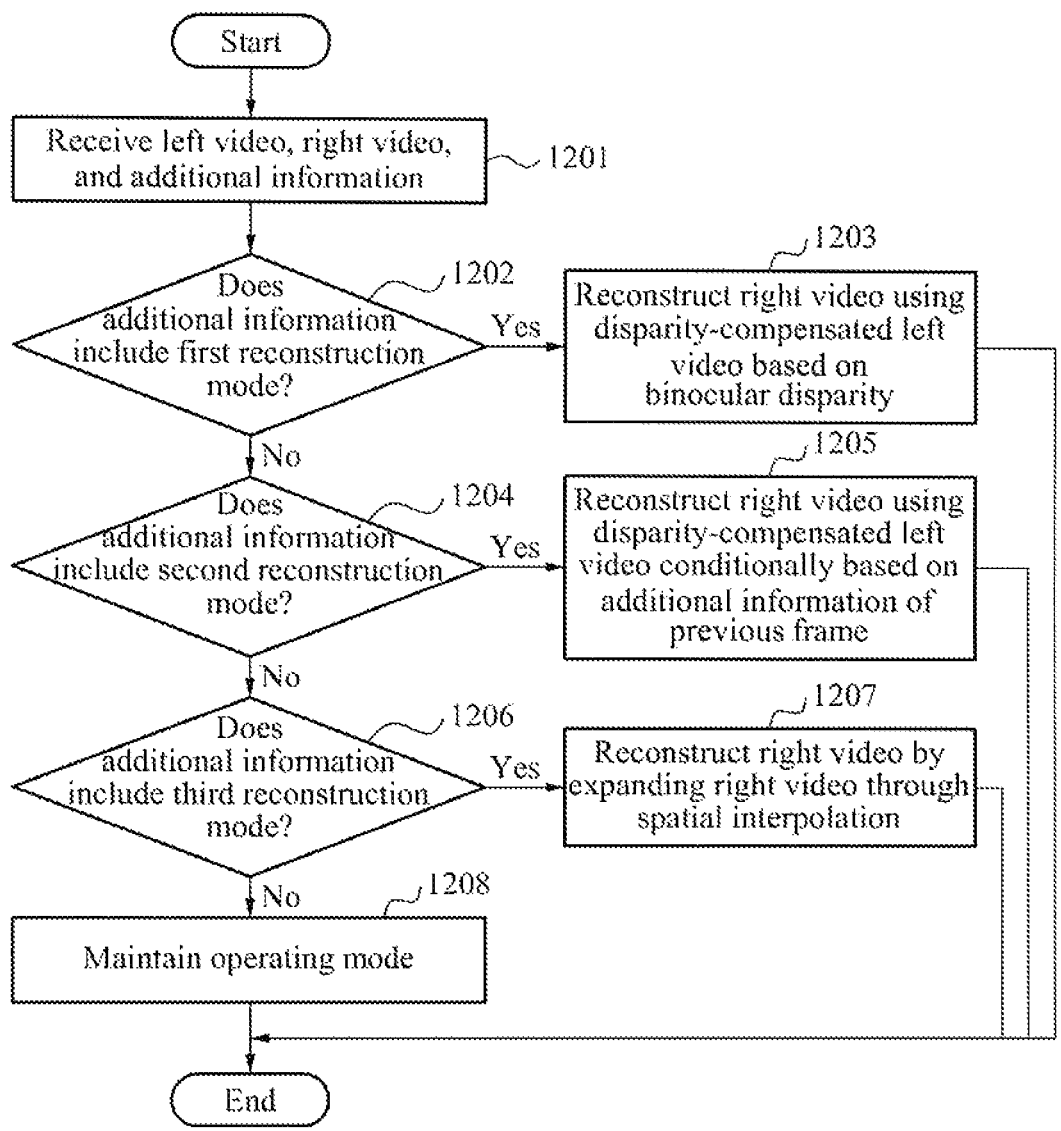
FIG. 12 is a flowchart illustrating a method of reconstructing a right video in a video playing apparatus according to an exemplary embodiment of the present invention.

FIG. 12 is a flowchart illustrating a method of reconstructing a right video in a video playing apparatus according to an exemplary embodiment of the present invention.

Referring to FIG. 12, in operation 1201, the video playing apparatus 102 may receive a left video, a right video, and additional information. The left video and the right video may be transmitted via different broadcast networks. The left video may be transmitted via a fixed broadcast network, for example, through a TS-M channel, and the right video may be transmitted via a mobile broadcast network, for example, through an M/H channel. Due to the use of different transmission channels, the right video may be transmitted at a lower resolution than the left video. The additional information may be transmitted via at least one of the broadcast networks used to transmit the left video and the right video.

In operation 1202, the video playing apparatus 102 may determine whether the additional information includes a first reconstruction mode. Operation 1202 may be performed for each block or pixel of the right video. As described in the foregoing, the first reconstruction mode refers to reconstructing the right video into a first reconstructed right video generated using the left video by compensating for disparity based on binocular disparity of a current frame. In operation 1203, when the additional information includes the first reconstruction mode, the video playing apparatus 102 may reconstruct the right video using the left video by compensating for disparity based on the binocular disparity of the current frame.

In operation 1204, the video playing apparatus 102 may determine whether a second reconstruction mode is included in the additional information. Operation 1202 may be performed for each block or pixel of the right video. As described in the foregoing, the second reconstruction mode refers to reconstructing the right video into a second reconstructed right video generated using the left video by compensating for disparity based on binocular disparity of a previous frame. For example, by replacing a portion of an additional video with a disparity-compensated reference video having high resolution based on the binocular disparity of the previous frame, the second reconstructed right video may be generated by conditional disparity compensation. In this example, the second reconstructed right video may be generated by applying disparity compensation to only a pixel to which a binocular disparity vector is assigned normally among the previous frame and a non-compensated pixel in the second reconstructed right video may fail to have a meaningful pixel value. In operation 1205, when the additional information includes the second reconstruction mode, the video playing apparatus 102 may reconstruct the right video using the left video by compensating for disparity based on the binocular disparity of the previous frame.

In operation 1206, the video playing apparatus 102 may determine whether the additional information includes a third reconstruction mode. Operation 1206 may be performed for each block or pixel of the right video. As descried in the foregoing, the third reconstruction mode may refer to reconstructing the right video into a third reconstructed right video by increasing resolution of the right video through spatial interpolation. In operation 1207, when the additional information includes the third reconstruction mode, the video playing apparatus 102 may reconstruct the right video by interpolating the right video spatially.

When the additional information fails to include the third reconstruction mode in operation 1206, the video playing apparatus 102 may maintain a corresponding block in an operating mode. Although FIG. 12 shows operations 1202, 1204, and 1206 in a sequential order, the present invention is not limited to a specific order. The video playing apparatus 102 may perform one of operations 1203, 1205, and 1207 directly after verifying the reconstruction mode included in the additional information absent determining the additional information as in operations 1202, 1204, and 1206.

Figure 13:
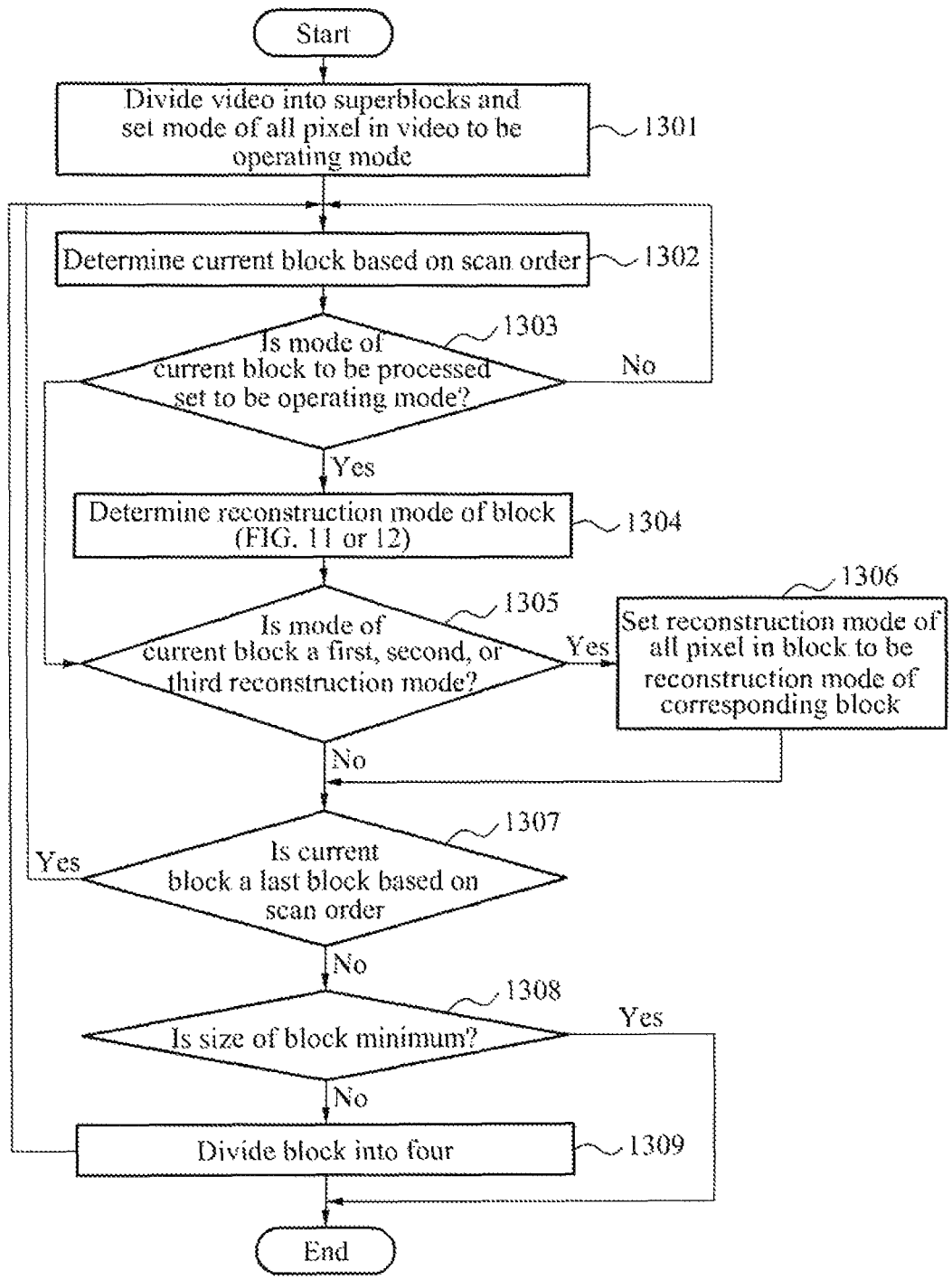
FIG. 13 is a flowchart illustrating a method of operating a video providing apparatus or a video playing apparatus according to an exemplary embodiment of the present invention.

FIG. 13 is a flowchart illustrating a method of operating a video providing apparatus or a video playing apparatus according to an exemplary embodiment of the present invention.

In FIG. 13, a description of the video providing apparatus 101 is provided, and the same disclosure may be applied to the video playing apparatus 102.

In operation 1301, the video providing apparatus 101 may divide a right video into superblocks, and may set a reconstruction mode for all pixels of the entire video to be an operation mode. Here, the operating mode may correspond to non-selection of a predetermined reconstruction mode.

In operation 1302, the video providing apparatus 101 may determine a current block to be processed in a scan order. In operation 1303, the video providing apparatus 101 may determine whether a reconstruction mode for the current block is set to be the operating mode.

In operation 1304, when the reconstruction mode for the current block is set to be the operating mode, the video providing apparatus 101 may determine the reconstruction mode for the current block. In operation 1305, the video providing apparatus 101 may determine whether the reconstruction mode for the current block is set to be one of a first reconstruction mode, a second reconstruction mode, and a third reconstruction mode.

In operation 1306, when the reconstruction mode for the current block is set to be one of the first reconstruction mode, the second reconstruction mode, and the third reconstruction mode, the video providing apparatus 101 may set a reconstruction mode for all pixels of the corresponding block to be the reconstruction mode for the corresponding block.

In operation 1307, when the reconstruction mode for the current block fails to be set to be one of the first reconstruction mode, the second reconstruction mode, and the third reconstruction mode, the video providing apparatus 101 may determine whether the current block is a last block of the entire video in a scan order. When the current block is a last block, the video providing apparatus 101 may revert to operation 1302. When the current block is not a last block, the video providing apparatus 101 may determine whether the current block has a predetermined minimum size in operation 1308. In operation 1309, when the current block fails to have the predetermined minimum size, the video providing apparatus 101 may divide the current block into four sub-blocks using a quadtree. The four sub-blocks may experience operations 1302 through 1309. When the current block has the predetermined minimum size, the process may end.

According to exemplary embodiments, the present invention may reconstruct a right video having even lower video quality than a left video effectively when providing a fixed/mobile convergence 3DTV broadcast service using an ATSC-M/H broadcast system. The fixed/mobile convergence 3DTV broadcast service using an ATSC-M/H broadcast system may provide a higher quality broadcast service than a 2D broadcast by minimizing the quality degradation due to video transmission through a fixed broadcast channel and a mobile broadcast channel.

Also, the present invention may be applied to a resolution difference between videos transmitted through a fixed broadcast channel and a mobile broadcast channel. As an example, the present invention may be applied to a 3DTV broadcast service through DVB-T2 for high-resolution fixed broadcasting and T-2 mobile/NGH for low-resolution mobile broadcasting, a 3DTV broadcast service through ISDB-T for high-resolution fixed broadcasting and OneSeg for low-resolution mobile broadcasting, and a simulcast service for an HD video, or a reference video, and an SD video, or an additional video of a predetermined program via a fixed broadcast network, for example, DVB services covering some European countries. As another example, the present invention may be also applied to a plurality of low-resolution videos having different disparities for one high-resolution video.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for providing a video, the apparatus comprising:
   one or more processors configured to:
   identify a high-resolution reference video and a low-resolution additional video;
   determine a reconstruction mode for the low-resolution additional video; and
   transmit the high-resolution reference video, the low-resolution additional video, additional information including the reconstruction mode, and a disparity between the high-resolution reference video and the low-resolution additional video,
   wherein the high-resolution reference video is a left video, and the low-resolution additional video is a right video for three-dimensional television (3DTV) service,
   wherein the high-resolution reference video is transmitted via a fixed broadcast network, and the low-resolution additional video is transmitted via a mobile broadcast network,
   wherein the reconstruction mode and the disparity are processed based on a temporal correlation or a spatial correlation, and
   wherein the reconstruction mode and the disparity are processed using variable block encoding using a quadtree, when the spatial correlation is used.

2. The apparatus of claim 1, wherein the one or more processors generates a first reconstructed additional video using the high-resolution reference video by compensating for disparity based on binocular disparity, and a second reconstructed additional video by interpolating the low-resolution additional video spatially.

3. The apparatus of claim 2, wherein the one or more processors determines the reconstruction mode for the low-resolution additional video by comparing the first reconstructed additional video and the second reconstructed additional video to a high-resolution additional video.

4. The apparatus of claim 2, wherein the one or more processors generates a first reconstructed additional video using the high-resolution reference video by compensating for disparity based on binocular disparity of a current frame, a second reconstructed additional video using the high-resolution reference video by compensating for disparity based on binocular disparity of a previous frame, and a third reconstructed additional video by interpolating the low-resolution additional video spatially.

5. The apparatus of claim 4, wherein the one or more processors determines the reconstruction mode for the low-resolution additional video by comparing the first reconstructed additional video, the second reconstructed additional video, and the third reconstructed additional video to a high-resolution additional video.

6. The apparatus of claim 2, wherein the binocular disparity is determined by estimating disparity between the high-resolution reference video and the high-resolution additional video.

7. The apparatus of claim 1, wherein the one or more processors determines the reconstruction mode for a block or pixel of the high-resolution reference video.

8. A method of providing a video, the method comprising:
identifying a high-resolution reference video and a low-resolution additional video;
determining a reconstruction mode for the low-resolution additional video; and transmitting the high-resolution reference video, the low-resolution additional video, additional information including the reconstruction mode, and a disparity between the high-resolution reference video and the low-resolution additional video,
wherein the high-resolution reference video is a left video, and the low-resolution additional video is a right video for three-dimensional television (3DTV) service,
wherein the high-resolution reference video is transmitted via a fixed broadcast network, and the low-resolution additional video is transmitted via a mobile broadcast network,
wherein the reconstruction mode and the disparity are processed based on a temporal correlation or a spatial correlation, and
wherein the reconstruction mode and the disparity are processed using variable block encoding using a quadtree, when the spatial correlation is used.

* * * * *